Fig. 1

Dec. 8, 1964 T. BUDZICH 3,160,102
VARIABLE VOLUME PUMP
Filed Sept. 28, 1962 3 Sheets-Sheet 2

INVENTOR.
TADEUSZ BUDZICH
BY
RICHEY, McNENNY & FARRINGTON
*H. F. McNenny*
ATTORNEYS Dec. 8, 1964  T. BUDZICH  3,160,102
VARIABLE VOLUME PUMP
Filed Sept. 28, 1962  3 Sheets-Sheet 3

INVENTOR.
TADEUSZ BUDZICH
BY
RICHEY, MCNENNY & FARRINGTON
ATTORNEYS

United States Patent Office 3,160,102
Patented Dec. 8, 1964

3,160,102
VARIABLE VOLUME PUMP
Tadeusz Budzich, Shaker Heights, Ohio, assignor to The Weatherhead Company, Cleveland, Ohio, a corporation of Ohio
Filed Sept. 28, 1962, Ser. No. 226,888
15 Claims. (Cl. 103—37)

This invention relates generally to variable displacement pumps and controls for such pumps and more particularly to controls for regulating the output of such pumps in response to the output flow rate of the pump.

It is a primary object of this invention to provide a novel flow control for a variable displacement pump which is adapted to maintain the rate of output flow constant at any adjusted level independently of variations in the outlet pressure of the pump.

It is another object of this invention to provide a control for a variable displacement pump for maintaining a constant rate of output flow employing a variable area orifice to allow the rate of output flow to be easily and selectively adjusted from the maximum output volume of the pump down to substantially zero rate of flow.

It is another object of this invention to provide a flow responsive control system for a variable displacement pump employing a variable area orifice which introduces a minimum of restriction and a minimum of pressure drop across the orifice to allow the pump to supply to the connected system the full rate of flow at substantially the maximum rated outlet pressure of the pump while maintaining full regulation of the rate of flow.

It is another object of this invention to provide a flow control for a variable displacement pump which operates in response to a minimum pressure differential across an orifice in the pump outlet line and which amplifies the pressure drop across the orifice into an increased pressure for actuating the fluid motor used to vary the output displacement of the pump.

It is another object of this invention to provide a flow control for a variable displacement pump which operates to maintain a constant output volume over a wide range of speeds of the prime mover driving the pump by varying the effective displacement of the pump to compensate for changes in the output volume at different operating speeds.

It is another object of this invention to provide a flow responsive control for a variable displacement pump as set forth in the preceding objects which operates with a high degree of accuracy and stability while preserving rapid response to transient conditions.

It is another object of this invention to provide a variable displacement pump incorporating a flow control for maintaining a constant regulated output volume at varying output pressures up to the maximum operating pressure of the pump which includes a pressure compensated control to limit the maximum output pressure by reducing the effective output volume of the pump in which the pressure compensated control is adapted to override the flow control to positively limit the maximum pump outlet pressure independently of the selected rate of flow and the operation of the flow responsive control.

It is still another object of this invention to produce a pump incorporating a flow responsive control as set forth in the preceding objects which is simple in construction, has a high degree of reliability and lends itself to low cost of manufacture.

All of the foregoing objects and advantages are accomplished in the preferred embodiment of a pump control system shown in connection with a pump of the axial piston type in which the output volume is regulated by the so-called spill type of control accomplished by moving the cylinder block relative to the pump housing and the cylinder stroke by means of an expansible chamber fluid motor incorporating a single cylinder and a floating piston dividing the cylinder into two separate motor chambers. One of the motor chambers is controlled by a pressure compensated control adapted to shift the cylinder block to the minimum displacement position whenever the outlet pressure exceeds a predetermined level to positively limit the maximum outlet pressure of the pump. The other chamber of the fluid motor is controlled by a flow responsive control valve which operates on the pressure differential across a variable area orifice placed in the outlet line of the pump. The upstream and downstream pressures are applied to opposite sides of a piston having a relatively large area and which is adapted to move an axially slidable valve spool which is arranged to admit pump outlet pressure into the motor to reduce the output displacement and to exhaust the fluid from the motor. The valve spool is biased in one direction by the differential pressure from the orifice and this force is counterbalanced in part by a control spring and in part by the control pressure within the fluid motor which acts upon an effective piston area much smaller than the piston area subjected to the pressure differential across the orifice. As a result, the control pressure remains proportional to the pressure differential across the orifice but is much greater due to the differential areas upon which the respective pressures are acting so that only a relatively small orifice pressure differential is required to produce a relatively high control pressure for shifting the cylinder block to vary the displacement of the pump.

Further objects and advantages of this invention will readily become apparent to those skilled in the art upon a more complete understanding of the preferred embodiment of the invention which is shown in the accompanying drawings and described in the following detailed description.

Figure 1:
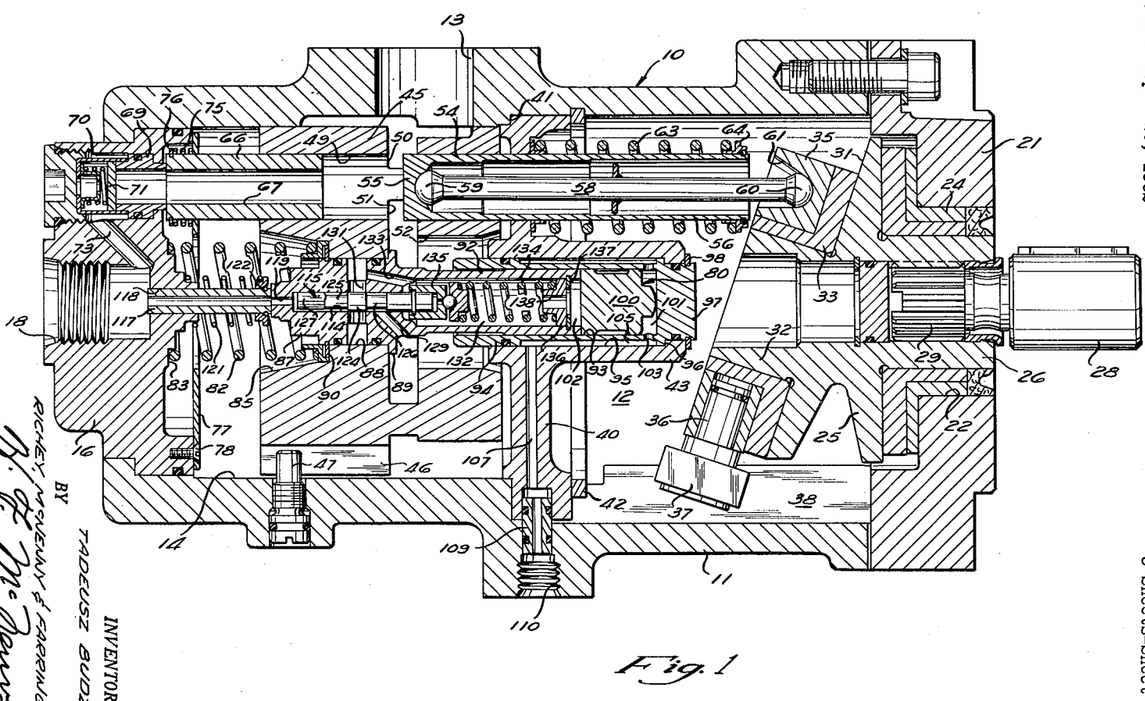
FIGURE 1 is a cross-sectional view of a pump including a pressure compensated control adapted for use for the flow control of the present invention.

Referring now to the figures in greater detail, the pump 10 is shown in detail in FIGURE 1 and includes a pump housing 11 which defines a fluid chamber 12 within which the pumping mechanism is mounted. The fluid chamber 12 is filled with hydraulic fluid at all times through the inlet 13 for supply to the pumping cylinders. The pump housing 11 has an internal cylindrical portion 14 at one end which is closed off by the outlet housing 16 which is suitably secured to the housing 11 and carries the pump outlet 18.

At the other end, pump housing 11 is closed off by an end plate 21 which has a centrally located opening 22 therein and supports a bearing member 24. Bearing member 24 serves both as a radial and a thrust bearing for the drive member 25 which has a shank 26 which is hollow to receive the end of a stub shaft 28 which rotates the drive member 25 by means of a splined connection at 29.

The drive member 25 has an inclined face 31 from which projects a hub portion 32. A bearing member 33 is mounted on hub portion 32 and inclined face 31 to provide a support for the wobble plate 35. While the drive member 25 rotates, the wobble plate 35 is prevented from rotating in the pump housing by means of a radially projecting stud 36 which rotatably supports a bearing block 37 adapted to slide axially within the guide channel 38. Thus, rotation of the drive member 25 by the stub shaft 28 connected to a prime mover causes the inclined face 31 to impart an oscillating movement to the wobble plate 35 so that each point on the wobble plate reciprocates axially with a generally sinusoidal motion.

Intermediate the outlet housing 16 and end plate 21, a web member 40 extends transversely across the interior of the pump housing 11. The web member 40 is positioned within the pump housing by means of a shoulder 41 on the pump housing and a snap-ring 42. The web member 40 is provided with a centrally located elongated boss 43 which contains the fluid motor assembly which will be described in greater detail hereinafter.

Between the web member 40 and the outlet housing 16, the cylinder block 45 is slidably journaled in the cylindrical housing portion 14 for axial sliding movement between the web member 40 and the outlet housing 16. The cylinder block 45 has a longitudinal groove 46 along its outer periphery which engages a guide pin 47 carried in the pump housing wall to prevent rotation of the cylinder block within the pump housing. The cylinder block 45 is provided with a plurality of cylinder bores 49 arranged equidistantly around the cylinder block. Since all of the cylinder bores 49 are identical, only one has been shown in the drawing and will be described with its accompanying mechanism hereinafter.

The cylinder bores 49 extend from end to end through the cylinder block 45 and are provided with ports at a point intermediate their ends to admit fluid into their interior. For this purpose, outer ports 50 are formed around the outer periphery of the cylinder block to open inward into the cylinder bores 49 and likewise inner ports 51 open radially outward into the cylinder bores 49 from a central axial bore 52 extending inward from the end of the cylinder block adjacent the web member 40.

At the one end of the cylinder bore 49, a piston 54 is slidably mounted and has a head portion 55 which is positioned to uncover the inlet ports 50 and 51 only when the piston is in the retracted position and the cylinder block 45 is in the maximum displacement position adjacent the web member 40. The piston 54 has a length of stroke such that when the cylinder block is shifted to the minimum displacement position adjacent the outlet housing 16, the piston head 55 will close off the ports 50 and 51 only at the end of the stroke and therefore the pump will have a zero output displacement. The piston 54 has a skirt portion 56 extending through suitable openings in the web member 40 toward the wobble plate 35. In order to reciprocate the piston 54, a piston rod 58 has a ball-end 59 which engages the piston underneath the head portion 55. At the other end, piston rod 58 has another ball-end 60 which fits within a cup-like recess 61 on the exposed face of the wobble plate 35 so that during oscillation of the wobble plate 35, the piston rod 58 will impart forward or pumping movement to the piston 54. The pistons 54 are retracted toward the wobble plate 35 by means of a coil spring 63 which fits around the piston skirt 56. Spring 63 abuts at one end against the stationary web member 40 and at the other end against a retainer 64 carried on the end of the piston skirt.

A tubular reaction piston 66 is fitted within the other end of the cylinder bore 49 and extends toward the outlet housing 16. The reaction piston 66 has a hollow bore 67 to conduct fluid to a hollow port member 69 carried on the outlet housing 16. The reaction piston 66 makes a face-to-face sealing contact with the end of the port member 69 so as to provide a fluid-tight pressure seal regardless of possible movement between the reaction piston carried in the cylinder block 45 and the port member. The port member 69 communicates with a chamber 70 within the outlet housing 16 which contains a check valve assembly 71 to prevent reverse flow back into reaction piston 66. A passage 73 within the outlet housing 16 conducts fluid from the chamber 70 to the pump outlet 18. In order to maintain the reaction piston 66 in sealing contact with the port member 69, a helical spring 75 is mounted on the end of the reaction piston 66 adjacent port member 69. The spring 75 abuts at the one end against a snap-ring 76 carried on the end of the reaction piston and at the other end against a retainer plate 77 which is secured to the inner face of outlet housing 16 by means of suitable screws indicated at 78.

It will be understood that the displacement of the pump is varied by moving the cylinder block 45 axially within the pump housing 11. The cylinder block 45 is urged toward the minimum displacement position adjacent the outlet housing 16 by means of a fluid motor assembly indicated generally at 80 carried on the central boss 43 of the web member 40. This movement of the cylinder block is opposed by means of the cylinder block spring 82 which serves to bias the cylinder block 45 to maximum displacement position adjacent the web member 40 in opposition to the action of the fluid motor assembly 80. The cylinder block spring 82 is positioned by means of means of a boss 83 on the inner face of outlet housing 16 and at the other end, the cylinder block spring 82 is received within an enlarged counterbore 85 on the side of the cylinder block 45 facing the outlet housing.

The pump is provided with a pressure compensated control which serves to limit the maximum outlet pressure of the pump by admitting fluid to the fluid motor assembly 80 whenever the outlet pressure exceeds a predetermined level to shift the cylinder block 45 toward the minimum displacement position and maintain the pump output displacement at the reduced level necessary to prevent the outlet pressure from exceeding this predetermined level. The pressure compensated control valve is mounted within a centrally located valve body 87 which is located within a bore 88 in the cylinder block 45 between the counterbore 85 and a central bore 52. The valve body 87 is positioned against axial movement in bore 88 by means of the shoulder 89 and the snap-ring 90. The valve body 87 has a piston portion 92 which projects toward the web member 40 where it is received within a cylinder bore 93 within the cylinder member 94. The cylinder member 94 in turn is carried within an axial bore 95 in a boss 43 and is positioned against axial movement therein by means of the shoulder at 96 and a snap-ring 98 on the outer end of the neck portion 97 which projects through an opening in the end of the central boss 43.

A floating piston 100 is mounted within the cylinder bore 93 between the piston portion 92 of valve body 87 and the neck portion 97. Floating piston 100 is free to slide axially within the cylinder bore 93 and divides the bore 93 into a first motor chamber 101 adjacent the neck portion 97 and a second motor chamber 102 between the floating piston 100 and the piston portion 92. Fluid is admitted into the first motor chamber 101 through a radial port 103 in the wall of cylinder member 94. This port 103 communicates with an elongated annular groove 105 on the outer periphery of the cylinder member 94. In turn, the annular groove 105 communicates with a radial passage 107 in the web member 40. This radial passage 107 extends outward and makes connection through the tubular fitting indicated at 109 with a control port 110 on the outer surface of the pump housing 11. It will be understood that when fluid is admitted into the first motor chamber 101 through control port 110, it will move the floating piston 100 into abutting contact with the piston portion 92 of valve body 87 and thus shift the cylinder block 45 against the bias of spring 82 toward the reduced displacement position adjacent the pump outlet housing 16.

The pressure compensated control valve is adapted to admit fluid from the pump outlet to the second motor chamber 102 to likewise shift the cylinder block 45 toward the minimum displacement position. The pressure compensated control valve includes a valve spool 115 which is mounted for axially sliding movement within an axial bore 114 in the valve body 87. Fluid is communicated to axial bore 114 from the pump outlet 18 by means of a transfer tube 117. The transfer tube 117 is slidably fitted within a bore 118 in the boss 83 on the pump outlet housing so as to permit it to slide with the cylinder block 45 and maintain fluid communication between the outlet and bore 114 at all times. The transfer tube 117 makes a face-to-face sealing contact with the end of the valve body 87 and admits fluid through the passage 119 in the valve body into the axial bore 114. To maintain this face-to-face sealing contact between the transfer tube 117 and the valve body 87, a biasing spring 121 surroundings the transfer tube 117 to abut at one end against the boss 83 and at the other end against a spring retainer 122 carried on the end of the transfer tube 117.

The valve spool 115 is provided with a centrally located land 124 defined by outer and inner annular grooves 125 and 126 formed on the valve spool. The outer groove 125 is at all times in communication with the outlet pressure admitted through transfer tube 117 by means of the flats 127 on the outer end of the valve spol. A drain passage 129 extends through the valve body 87 from the inner groove 126 to the fluid chamber 12 so that the inner groove 126 is always at the low pressure level within the pump housing 11. The valve body 87 has a radial port 131 adjacent the land 124 which is connected through a passage 133 to a cylindrical chamber 132 within the piston portion 92 of the valve body. A control spring 134 is located within the chamber 132 and at its one end engages a spring abutment 135 carried on the inner end of the valve spool 115. At its other end, control spring 134 engages a plug 136 which is positioned in the outer end of chamber 132 by means of a snap-ring 137. The plug 136 is provided with a passage 138 therethrough so that the fluid admitted into the chamber 132 may flow through the plug 136 into the second motor chamber 102.

The operation of the pressure compensated control valve is determined by the balance of the various forces acting on the valve spool 115. These forces include the fluid at outlet pressure admitted to the transfer tube 117 which biases the valve spool 115 toward the chamber 132. This force is opposed by the control spring 134 and the control pressure in chamber 132 and motor chamber 102. Since the control pressure force is relatively small as compared to the other forces, it may be disregarded so far as the operation of the pressure compensated control is concerned. When the outlet pressure is low, the control spring 134 will bias the valve spool 115 from the neutral position shown in FIGURE 1 toward the left so that the radial port 131 is in communication with the inner groove 126. This permits any fluid within the second motor chamber 102 to be drained through the passage 138 and into chamber 132 and from there to the passage 133, annular port 131, inner groove 126 through the drain passage 129 to the fluid chamber 12. This assures that the force of the cylinder block spring 82 will bias the cylinder block 45 toward the web member 40 so that the piston portion 92 will be in abutting engagement with the floating piston 100, the position of which will be determined by the fluid within the first motor chamber 101 which is controlled by the flow control valve as described hereinafter in greater detail.

Whenever the pressure in the pump outlet 18 exceeds the predetermined limit determined by the biasing force of control spring 134, fluid at outlet pressure will be admitted through the transfer tube 117 into the axial bore 114 and will shift the valve spool 115 toward the right from the neutral position shown in FIGURE 1. In this position, the outer groove 125 will be moved into alignment with the annular port 131 and fluid at full outlet pressure will then flow into the annular port 131 and from there through passage 133 into the chamber 132 from which it will flow through the passage 138 into the second motor chamber 102. The fluid pressure thus admitted into the second motor chamber 102 will shift the cylinder block 45 toward the minimum displacement position and maintain it in that position until the outlet pressure drops to a level where the control spring 134 is able to move the valve spool 115 toward the left and thus connect the second motor chamber 102 to the fluid chamber 12 to drain the fluid from the second motor chamber in a manner described hereinabove and thereby allow the cylinder block spring 82 to shift the cylinder block 45 toward an increased displacement position. Thus, regardless of the position of the floating piston 100 and any fluid in the first motor chamber 101, the pressure compensated control valve always operates to reduce the output displacement in response to the pressure level at the pump outlet 18 reaching a predetermined maximum and thereby serves to positively limit the maximum outlet pressure without the need for relief valves or bypass valves in the external fluid system.

Figure 2:
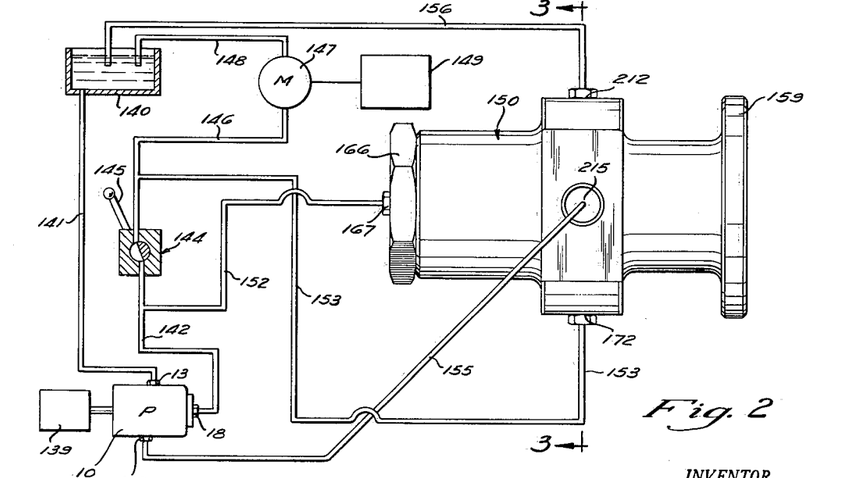
FIGURE 2 is a schematic view of a circuit incorporating the pump of FIGURE 1 together with the variable orifice and the flow control valve.

The structure and operation of the flow control valve controlling the output volume of the pump through the action of the first motor chamber 101 can be seen most clearly in connection with the schematic showing of the hydraulic circuit in FIGURE 2. The pump 10 is driven by a suitable prime mover 139 which may be, for example a variable speed internal combustion engine and is connected through inlet line 141 to a fluid reservoir 140. The output of the pump flows through an outlet line 142 connected to outlet 18 through a variable area orifice indicated at 144. The area of the orifice may be adjusted by handle 145 to provide a variable restriction to the flow through the orifice and may be of any of the well known types arranged to allow adjustment of the orifice area from substantially no restriction in the line down to a complete restriction as will be required to produce the necessary pressure drop across the orifice under the varying rates of flow ranging from the maximum output volume of the pump down to zero flow. Fluid passes from the variable orifice 144 through a line 146 to the load in the hydraulic circuit which has been indicated as being a hydraulic motor 147, from which the fluid flows through a draining line 148 back to reservoir 140. The motor 147 may be, for example, a fixed displacement motor driving a rotatable load indicated at 149 such as a rotating antenna which is to be driven at a selected steady speed which is controlled by the rate of flow through the motor 147. Thus, the speed of load 149 is controlled by adjusting the area of orifice 144.

The flow control valve is indicated at 150 and is connected to the circuit through a first or upstream line 152 which is connected to the output line 142 between the pump and the orifice 144. The other or downstream line 153 is connected to the line 146 on the other side of the orifice from the point of connection of line 152. A control line 155 conducts fluid from the flow control valve 150 to the pump 10 and is connected to the control port 110 indicated in FIGURE 1. The flow control valve 150 also has its own drain line 156 to conduct fluid back to the reservoir 140.

Figure 3:
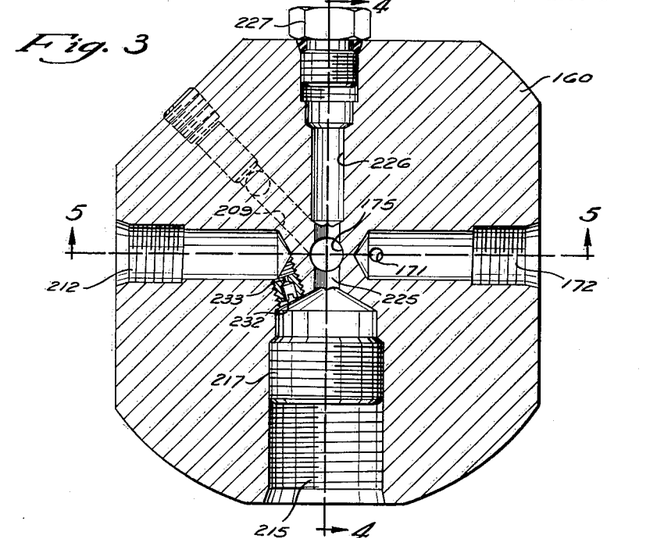
FIGURE 3 is a cross-sectional view through the flow control valve taken on line 3—3 of FIGURE 2.
Figure 4:
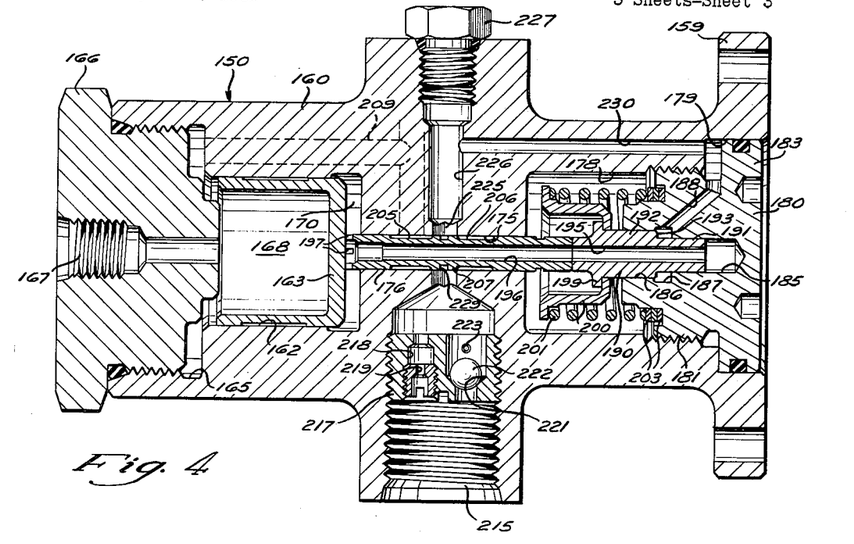
FIGURE 4 is a longitudinal cross-sectional view through the flow control valve taken on line 4—4 of FIGURE 3.
Figure 5:
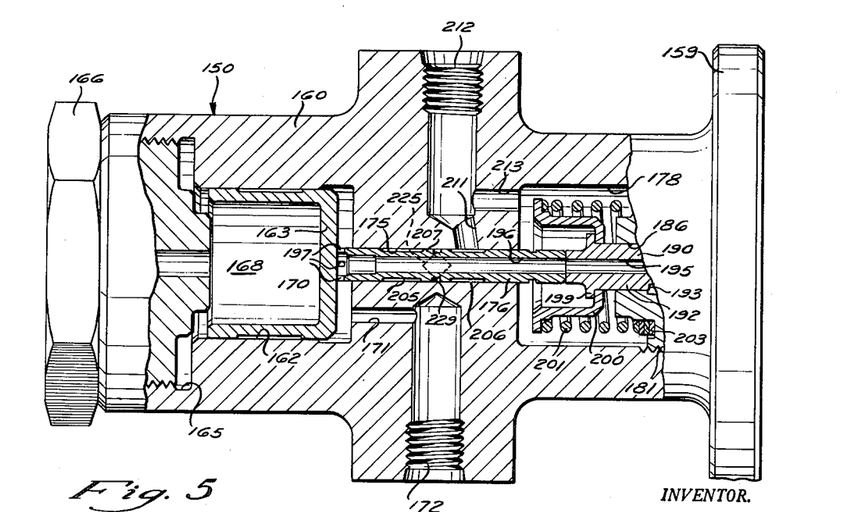
FIGURE 5 is a longitudinal cross-sectional view of the flow control valve taken on line 5—5 of FIGURE 3.

The construction of the flow control valve 150 is shown in detail in FIGURES 3, 4 and 5. The valve is shown as having a valve body 160 with a mounting flange 159 at one end. At the other end, the valve body 160 is provided with a cylinder bore 162 within which is slidably fitted a cup-shaped piston 163. A counterbore 165 is formed in valve body 160 outwardly of the cylinder bore 162 and is closed off by a threaded plug 166. Plug 166 is provided with a port 167 which is connected to the upstream line 152 and opens into a high pressure chamber 168 on the outer side of piston 163. The other side of piston 163 together with the end of cylinder bore 162 defines a low pressure chamber 170 which is connected through passageway 171 to an inlet port 172 which in turn is connected to the downstream line 153 on the other side of the variable orifice 144. Thus, the piston 163 is at all times biased toward the right as seen in FIGURES 4 and 5 by a force proportional to the differences in the pressures in the upstream and downstream lines 152 and 153, respectively, which pressure difference corresponds to the pressure drop across the variable orifice 144.

The valve body 160 has a reduced axial bore 175 extending from the cylinder bore 162 to slidably receive a valve spool 176. At the other end, axial bore 175 opens into a second bore 178 which is also provided with an enlarged counterbore 179 at its outer end. The bore 178 and counterbore 179 are closed off by means of a plug 180 which has a threaded portion 181 received within the outer end of bore 178 to prevent communication between bore 178 and counterbore 179 which in turn is sealed off by the flange 183 on plug 180. Plug 180 is provided with a reduced bore 185 of the same diameter as bore 175 and in axial alignment therewith. At the outer end of bore 185, the plug 180 has a larger counterbore 186 which is separated from the smaller bore 185 by an annular groove 187 which is connected by a passage 188 to the counterbore 179. A plunger 190 is slidably fitted within the bores 185 and 186 to have a small cylindrical portion 191 extending into the smaller bore 185 and a larger cylindrical portion 192 fitting within the larger bore 186. The plunger 190 has an annular radial face 193 between the two cylindrical portions 191 and 192 to lie within the annular groove 187. A bore 195 extends through the plunger 190 from end to end to align with an axial bore 196 in the valve spool 176. The plunger 190 and valve spool 176 make face-to-face sealing contact to prevent leakage from the bores 195 and 196. At the other end of valve spool 176 radial slots 197 extend outward from the bore 196 on the end of valve spool 176 to provide a passage to allow fluid from the lower pressure chamber 170 to flow through the bores 196 and 195 into the reduced bore 185 to provide a biasing force acting on the effective area of the small cylindrical portion 191 to provide a counterbalance force equal to that of the fluid pressure in chamber 170 acting on the exposed end of valve spool 176.

The plunger 190 also has a radial flange 199 outward of the counterbore 186 to serve as a support for a spring retainer cup 200 which serves as an abutment for a compression control spring 201. Spring 201 abuts at the other end against shims 203 in contact with the plug 180, the shims 203 being used to vary the effective biasing force of the spring 201 which also provides a counterbalancing force for the valve spool 176 in opposition to the biasing force exerted by the piston 163.

The valve spool 176 has outer and inner annular grooves 205 and 206, respectively, extending thereabout within the axial bore 175. The grooves 205 and 206 define an annular land portion 207 between them for valving purposes as will be described in greater detail hereinafter. A passage 209 opens into the axial bore 175 opposite the outer groove 205 and as shown in FIGURE 4, it connects with the counterbore 165 and hence with the high pressure chamber 168 to insure that the outer groove 205 at all times will be connected to the high pressure fluid on the upstream side of the variable orifice 144. The inner groove 206 is connected through a passage 211 to a drain port 212 shown in FIGURE 5. Another passage 213 connects the drain port 212 to the bore 178 so that this chamber will always remain at low pressure during operation of the valve.

The valve body 160 is provided with a control port 215 as shown in FIGURES 3 and 4 which is connected by the control line 155 to the control port 110 on pump housing 11 and hence to the first motor chamber 101. An insert plug 217 is fitted within the control port 215 and has a threaded passage 218 to receive a threaded metering orifice 219 which controls the rate of fluid flow through the plug 217 to the motor chamber 101. The plug 217 also has a check valve assembly formed by valve seat 221 and movable ball 222 which is held in place by a retainer pin 223 to close against forward pressure flowing toward the control line 155 and to open under reverse flow conditions. Thus, flow in the forward direction through the control port 215 to first motor chamber 101 is limited by the opening in the metering orifice 219, while flow in the opposite direction is substantially unrestricted because of the opening of the check valve ball 222.

A diamond shaped control port 225 extends diametrically across the valve bore 175 in alignment with the land 207 with which it cooperates for valving purposes to control the flow of fluid to and from the control port 215. On the side opposite the control port 215, the diamond port 225 opens into a radial passage 226 which is closed off at its outer end by a threaded plug 227. The land 207 is provided at its mid-point with a small annular groove 229 to allow fluid flow between the passage 226 and the control port 215 during times when the land 207 blocks off the diamond port 225 from the outer and inner grooves 205 and 206. A passage 230 extends from the passage 226 to the counterbore 179 so that at all times, fluid at the control pressure present within the control port 215 will be conducted into passage 226 and hence through the passage 230 to counterbore 179 and from there through passage 188 to the annular groove 187 to exert a force on the annular face 193 of plunger 190 acting to counterbalance the force exerted on the valve spool 176 by the piston 163. It will also be noted as shown in FIGURE 3 that a threaded opening 232 extends between the control port 215 inward of the plug 217 and the drain port 212. A threaded metering orifice 233 is positioned within the threaded opening 232 to insure a continuing bleed of control pressure to drain for reasons which will be described in greater detail hereinafter.

The operation of the flow control valve 150 is determined by the axial position of the valve spool 176 which operates to connect the diamond port 225 to either high pressure through the outer groove 205 or to drain through the inner groove 206 to either admit or exhaust fluid to and from the control port 215 and the first motor chamber 101 in pump 10. Viewing the flow control valve as shown in FIGURES 4 and 5, there is a biasing force toward the right exerted on the valve spool 176 as a result of the pressure differential across the piston 163. This pressure differential is equivalent to the pressure drop across the variable orifice 144 acting on the full diameter of piston 163. This biasing force toward the right is opposed by two separate biasing forces tending to shift the valve spool 176 toward the left which would connect the control port 215 to drain to increase the effective operating volume of the pump 10. These forces are the biasing force of the compression spring 201, and the control pressure force acting on the annular face 193 of plunger 190. Since the force of compression spring 201 is always constant for any given axial position of valve spool 176, the ratio between the control pressure acting upon face 193 and the pressure drop across piston 163 determines the position of valve spool 176.

Returning to FIGURE 1, it will be seen that the pressure within the first motor chamber 101 between the floating piston 100 and the inner end of cylinder bore 93 is always proportional to the force exerted on the cylinder block by the cylinder block spring 82. The cylinder block spring 82 will be selected to have a preload of, for example, 50 pounds when the cylinder block 45 is in the maximum output displacement position adjacent the web member 40 and have a spring rate such that when the cylinder block is shifted to the minimum output displacement position adjacent the outlet housing 16, the force of spring 82 will be at a level of, for example, 150 pounds. Assuming that the floating piston 100 has an effective area of 1 square inch, this means that the control pressure supplied to the first motor chamber 101 through control port 110 and control line 155 must exceed 50 p.s.i. to cause any reduction in the output displacement of the pump, and when this control pressure reaches a level of 150 p.s.i., the pump will have zero output displacement.

In the flow control valve it will be noted that the piston 163 has a very much greater area than that of the annular face 193. Assuming that the area of piston 163 is 25 times the area of radial face 193, it will be seen that the control pressure necessary to counterbalance the pressure drop across the variable orifice 144 will be 25 times this pressure drop. Using the figures given above as an example, this means that whenever the pressure drop across orifice 144 exceeds 2 p.s.i., the control pressure acting in motor chamber 101 will rise above 50 p.s.i. to the level necessary to maintain a counterbalancing force to position the valve spool 176 so that the land 207 blocks off the diamond port 225 from both the outer and inner annular grooves 205 and 206. Likewise, when the pressure drop across orifice 144 reaches the level 6 p.s.i., the control pressure will have reached the level of 150 p.s.i. necessary to shift the cylinder block to the minimum displacement position. Therefore, the flow control valve operates to vary the effective displacement of the pump utilizing the relatively low pressure drop across the variable orifice 144 ranging between 2 p.s.i. and 6 p.s.i. for the full range of flow through the orifice from maximum down to zero. Since for a given flow the pressure drop across an orifice such as variable orifice 144 is directly proportional to the area, orifice 144 may be calibrated by a suitable control to allow the effective area of the orifice 144 to be varied to a maximum down to zero to regulate the output flow of the pump in turn for maximum down to zero, and at no time will the pressure drop across this orifice ever exceed the maximum level of 6 p.s.i.

Since systems of this sort are designed to operate at maximum output pressures as determined by the operation of the pressure compensated valve of, for example, 3,000 p.s.i., the pressure drop created by a variable orifice 144 is negligible in terms of reduced operating efficiency of the system. Furthermore, the flow control valve operates to regulate the flow for a given setting of the variable orifice 144 independently of the speed of rotation of the pump. If for example, the variable orifice 144 has been adjusted so that the desired output flow is only slightly less than that of the maximum output volume of the pump rotating at 1,000 r.p.m., the cylinder block 45 will be positioned just away from the web member 40 under a control pressure slightly in excess of 50 p.s.i. which reflects a pressure drop across the variable orifice 144 of only slightly more than 2 p.s.i. If the speed of the pump is then increased to 2,000 r.p.m. or twice the previous speed, the same position of the cylinder block would mean that the pump would have an output flow twice that of that present at the lower speed of 1,000 r.p.m. However, the increase flow across the orifice 144 will cause an increased pressure drop which is reflected into an increase to the control pressure in fluid motor chamber 102. This increase will then shift the cylinder block to a position intermediate the minimum and maximum until the output flow from the pump has been reduced to the previous set level.

Since it requires a control pressure of about 100 p.s.i. in the example given to hold the cylinder block in the intermediate position against the bias of spring 82, the 25 to 1 amplification of the pressure drop requires an increase in the pressure drop across the variable orifice 144 to only about 4 p.s.i. Thus, for maintaining the same rate of flow out of the variable orifice 144, a doubling of the speed of the pump means an increased pressure drop of only 2 p.s.i. which may be considered as negligible in terms of the operating pressures of the system. Thus, the present flow control valve, because of the amplification provided by the differential areas of piston 163 and radial face 193 and the relatively low pressures required for shifting the cylinder block, insures that even under widely varying speeds of operation of the pump, the change in pressure drop across the orifice 144 will still remain substantially negligible in terms of the operating efficiency of the system.

The orifice 233 has been provided to insure that the control pressure in motor chamber 102 will always be subject to a small bleed to drain which tends to allow the cylinder block 45 to be shifted to increased displacement position. The presence of this bleed requires that to maintain the cylinder block 45 in a stable position, the land 207 must be shifted slightly to the right of the neutral position to insure a small continuous flow of high pressure fluid through the outer groove 205 into the diamond port 225 equal to the rate of bleed through metering orifice 233. This gives increased stability to the system, since it is not possible in terms of practical production tolerances to make the axial length of land 207 exactly equal to the axial length of the diamond port 225 and this arrangement eliminates the possibility of a condition which would require a substantial movement of the valve spool 176 in either direction to provide any valving action by the land 207 in connecting the control pressure either to the high pressure supply in outer groove 205 or to drain through inner groove 206.

The metering orifice 219 in insert plug 217 and the check valve are employed to insure proper response of the cylinder block 45 under changing conditions. It will be appreciated that control pressure in the motor chamber 102 is relatively low while the pressure admitted into the control port 215 will be at full output pressure when the outer groove 205 is in alignment with diamond port 225. This higher pressure will provide the proper rate of flow through the metering orifice 219 and give the desired speed of response in the movement of the cylinder block 45 toward a reduced displacement condition. However, when it is desired to drain the motor chamber 101, the control fluid pressure will be at a much lower level and to provide the same rate of response it must flow through an opening substantially greater than that provided by metering orifice 219. Therefore, the ball 222 unseats to allow a greatly increased opening to allow draining of the fluid in the motor chamber 101 at a rate substantially equal to that at which the chamber is filled through metering orifice 219.

While the preferred embodiment of this invention has been shown and described in considerable detail, it is understood that various modifications and rearrangements will readily become apparent to those skilled in the art upon a full understanding of this invention, and such modification and rearrangements may be resorted to without departing from the scope of the invention as defined in the following claims.

What is claimed is:

1. In a variable displacement pump having an inlet connected to a reservoir, an outlet and displacement control means operable by a fluid motor to vary the effective output displacement of the pump, a flow responsive control comprising an orifice connected to said outlet, an upstream line connected to said outlet at the upstream side of said orifice, a downstream line connected to said outlet at the downstream side of said orifice, and a control valve connected to said upstream and said downstream lines, to said reservoir and to said fluid motor, said control valve including a movable valve member adapted to selectively connect said fluid motor to said pump outlet and to said reservoir, first piston means biasing said valve member in one direction responsive to the pressure differential across said orifice, and second piston means biasing said valve member in opposition to said first piston means responsive to fluid pressure in said fluid motor, said first piston means having a greater effective area than that of said second piston mean.

2. In a variable displacement pump having an inlet connected to a reservoir, an outlet and displacement control means operable by a fluid motor to vary the effective output displacement of the pump, a flow responsive control comprising an orifice connected to said outlet, an upstream line connected to said outlet at the upstream side of said orifice, a downstream line connected to said outlet at the downstream side of said orifice, and a control valve connected to said upstream and said downstream lines, to said reservoir and to said fluid motor, said control valve including a housing, an axial bore in said housing, a valve spool axially slidable in said bore and adapted to selectively connect said fluid motor to said pump outlet and to said reservoir, a first chamber in said control valve housing at one end of said axial bore, a second fluid chamber in said control valve housing at the other end of said axial bore, first piston means in said first chamber biasing said valve spool in one direction responsive to the pressure differential across said orifice, second piston means in said second chamber biasing said valve spool in opposition to said first piston means responsive to fluid pressure in said fluid motor, and means balancing said valve spool whereby movement of said valve spool is independent of the pressure level at said pump outlet.

3. In a variable displacement pump having an inlet connected to a reservoir, an outlet and displacement control means operable by a fluid motor to vary the effective output displacement of the pump, a flow responsive control comprising an orifice connected to said outlet, an upstream line connected to said outlet at the upstream side of said orifice, a downstream line connected to said outlet at the downstream side of said orifice, and a control valve connected to said upstream and said downstream lines, to said reservoir and to said fluid motor, said control valve including a housing, an axial bore in said housing, a valve spool axially slidable in said bore and adapted to selectively connect said fluid motor to said pump outlet and to said reservoir, a first chamber in said control valve housing at one end of said axial bore, a second fluid chamber in said control valve housing at the other end of said axial bore, first piston means in said first chamber biasing said valve spool in one direction responsive to the pressure differential across said orifice, second piston means in said second chamber biasing said valve spool in opposition to said first piston means responsive to fluid pressure in said fluid motor, said first piston means having a greater effective area than that of said second piston means to provide a higher pressure in said fluid motor than the pressure drop across said orifice, and means balancing said valve spool whereby movement of said valve spool is independent of the pressure level at said pump outlet.

4. In a variable displacement pump having an inlet connected to a reservoir, an outlet and displacement control means operable by a fluid motor to vary the effective output displacement of the pump, a flow responsive control comprising an orifice connected to said outlet, an upstream line connected to said outlet at the upstream side of said orifice, a downstream line connected to said outlet at the downstream side of said orifice, a control valve housing connected to said upstream and said downstream lines, a drain line connecting said control valve housing to said reservoir, a control line connecting said control valve housing to said fluid motor, an axially slidable valve member in said control valve housing, port means cooperable with said valve member to selectively connect said control line to said pump outlet and to said drain line, first piston means slidable in said control valve housing, said upstream line being connected to one side of said first piston means, said downstream line being connected to the other side of said first piston means whereby the pressure differential between said upstream and said downstream lines is applied across said first piston means to bias said valve member in one direction to connect said control line to said pump outlet, and second piston means slidable in said control valve housing, said second piston means being connected to said control line and operable responsive to pressure in said fluid motor to bias said valve member in the other direction to connect said control line to said drain lines.

5. The apparatus set forth in claim 4 including spring means in said control valve housing operable to bias said valve member in said other direction.

6. The apparatus set forth in claim 4 wherein said control line includes a metering orifice and check valve means by-passing said metering orifice and operable to by-pass around said metering orifice fluid flowing from said fluid motor to said control valve.

7. The apparatus set forth in claim 4 wherein said control valve housing includes a bleed passage connecting said control line to said drain line.

8. The apparatus set forth in claim 4 wherein said first piston means has an effective area greater than the effective area of said second piston means exposed to fluid motor pressure.

9. In a variable displacement pump having an inlet connected to a reservoir, an outlet and displacement control means operable by a fluid motor to vary the effective output displacement of the pump, a flow responsive control comprising an orifice connected to said outlet, an upstream line connected to said outlet at the upstream side of said orifice, a downstream line connected to said outlet at the downstream side of said orifice, a control valve housing connected to said upstream and said downstream lines, a drain line connecting said control valve housing to said reservoir, a control line connecting said control valve housing to said fluid motor, an axially slidable valve member in said control valve housing, port means cooperable with said valve member to selectively connect said control line to said pump outlet and to said drain line, a first piston slidable in said control valve housing and engageable with one end of said valve member, said upstream line being connected to one side of said first piston away from said valve member, said downstream line being connected to the other side of said first piston whereby the pressure differential between said upstream and said downstream lines is applied across said first piston to bias said valve member in one direction to connect said control line to said pump outlet, and a second piston slidable in said control valve housing and engageable with the other end of said valve member, said second piston having an effective area less than that of said first piston and connected to said control line to be operable responsive to pressure in said fluid motor to bias said valve member in the other direction to connect said control line to said drain line.

10. A variable displacement pump comprising a pump housing, an inlet to said pump housing, an outlet on said pump housing, pumping mechanism within said pump housing to pump fluid from said inlet to said outlet, said pumping mechanism including a cylinder block axially slidable in said pump housing to vary the effective output displacement of said pump, spring means biasing said cylinder block toward the maximum output displacement position, a first expansible chamber fluid motor adapted to shift said cylinder block against the bias of said spring means toward the minimum displacement position, a first control valve adapted to selectively connect said first fluid motor to said pump outlet and to drain, said first control valve being operable when the pump outlet pressure exceeds a predetermined level to admit fluid pressure to said first fluid motor to reduce the effective output displacement of the pump, a second expansible chamber fluid motor adapted to shift said cylinder block against the bias of said spring means toward the minimum displacement position, a flow responsive control comprising a variable area orifice connected to said outlet, an upstream line connected to said outlet at the upstream side of said orifice, a downstream line connected to said outlet at the downstream side of said orifice, and a second control valve connected to said upstream and said downstream lines and to said second fluid motor, said second control valve being operable responsive to the pressure drop across said orifice to selectively connect said second fluid motor to said outlet and to drain to vary the effective output displacement of the pump to maintain said output displacement of said pump substantially proportional to the area of said variable area orifice.

11. A variable displacement pump comprising a pump housing, a reservoir, an inlet from said reservoir to said pump housing, an outlet on said pump housing, pumping mechanism within said pump housing to pump fluid from said inlet to said outlet, said pumping mechanism including a cylinder block axially slidable in said pump housing to vary the effective output displacement of said pump, spring means biasing said cylinder block toward the maximum output displacement position, a first expansible chamber fluid motor adapted to shift said cylinder block against the bias of said spring means toward the minimum displacement position, a first control valve adapted to connect said first fluid motor to said pump outlet and to drain, said first control valve being operable when the pump outlet pressure exceeds a predetermined level to admit fluid pressure to said first fluid motor to reduce the effective output displacement of the pump, a second expansible chamber fluid motor adapted to shift said cylinder block against the bias of said spring means toward the minimum displacement position, a flow responsive control comprising a variable area orifice connected to said outlet, an upstream line connected to said outlet at the upstream side of said orifice, a downstream line connected to said outlet at the downstream side of said orifice, and a second control valve connected to said upstream and said downstream lines and to said reservoir and to said second fluid motor, said second control valve including a movable valve member adapted to selectively connect said second fluid motor to said pump outlet and to said reservoir, first means biasing said valve member in one direction to admit outlet pressure fluid to said second fluid motor responsive to the pressure differential across said orifice, and second means opposing said first means to bias said valve member to connect said second fluid motor to said reservoir responsive to the fluid pressure in said second fluid motor.

12. A variable displacement pump comprising a pump housing, a reservoir, an inlet from said reservoir to said pump housing, an outlet on said pump housing, pumping mechanism within said pump housing adapted to pump fluid from said inlet to said outlet, said pumping mechanism including a cylinder block axially slidable in said pump housing to vary the effective output displacement of said pump, spring means biasing said cylinder block toward the maximum output displacement position, a first expansible chamber fluid motor adapted to shift said motor block against the bias of said spring means toward the minimum displacement position, a first control valve adapted to connect said first fluid motor to said pump outlet and to drain, said first control valve being operable when the pump outlet pressure exceeds a predetermined level to admit fluid pressure to said first fluid motor to reduce the effective output displacement of the pump, a second expansible chamber fluid motor adapted to shift said cylinder block against the bias of said spring means toward the minimum displacement position, a flow responsive control comprising a variable area orifice connected to said outlet, an upstream line connected to said outlet at the upstream side of said orifice, a downstream line connected to said outlet at the downstream side of said orifice, a second control valve including a control valve housing connected to said upstream and said downstream lines, a drain line connecting said control valve housing to said reservoir, a control line connecting said control valve housing to said second fluid motor, an axially slidable valve member in said control valve housing, port means cooperable with said valve member to selectively connect said control line to said pump outlet and to said drain line, first piston means slidable in said control valve housing, said upstream line being connected to one side of said first piston means, said downstream line being connected to the other side of said first piston means whereby the pressure differential between said upstream and said downstream lines is applied across said first piston means to bias said valve member in one direction to connect said control line to said pump outlet, and second piston means slidable in said control valve housing, said second piston means being connected to said control line and operable responsive to pressure in said second fluid motor to bias said valve member in the other direction to connect said control line to said drain line.

13. A variable displacement pump comprising a pump housing, a reservoir, an inlet from said reservoir to said pump housing, an outlet on said pump housing, pumping mechanism within said pump housing adapted to pump fluid from said inlet to said outlet, said pumping mechanism including a cylinder block axially slidable in said pump housing to vary the effective output displacement of said pump, spring means biasing said cylinder block toward the maximum output displacement position, a first expansible chamber fluid motor adapted to shift said cylinder block against the bias of said spring means toward the minimum displacement position, a pressure compensated control valve adapted to connect first fluid motor to said pump outlet and to drain, said pressure compensated control valve being operable when the pump outlet pressure exceeds a predetermined level to admit fluid pressure to said first fluid motor to reduce the effective output displacement of the pump, a second expansible chamber fluid motor adapted to shift said cylinder block against the bias of said spring means toward the minimum output displacement position, a flow responsive control comprising a variable area orifice connected to said outlet, an upstream line connected to said outlet at the upstream side of said orifice, a downstream line connected to said outlet at the downstream side of said orifice, a flow responsive control valve including a control valve housing connected to said upstream and said downstream lines, a drain line connecting said control valve housing to said reservoir, a control line connecting said control valve housing to said second fluid motor, an axially slidable valve member in said control valve housing, port means cooperable with said valve member to selectively connect said control line to said pump outlet and to said drain line, first piston means slidable in said control valve housing, said upstream line being connected to one side of said first piston means, said downstream line being connected to the other side of said first piston means whereby the pressure differential between said upstream and said downstream lines is applied across said first piston means to bias said valve member in one direction to connect said control line to said pump outlet, spring means biasing said valve member in the other direction, and second piston means slidable in said control valve housing, said second piston means having an effective area substantially less than that of said first piston means and connected to said control line to be operable responsive to pressure in said second fluid motor to bias said valve member in said other direction to connect said control line to said drain line.

14. The pump set forth in claim 13 wherein said control lines includes a metering orifice and check valve means bypassing said metering orifice and operable to by pass around said metering orifice fluid flowing from said second fluid motor to said control valve housing.

15. The pump set forth in claim 13 wherein said control valve housing includes a bleed passage connecting said control line to said drain line.

References Cited by the Examiner
UNITED STATES PATENTS

| | | | |
|---|---|---|---|
| 2,238,063 | 4/41 | Kendrick | 103—120 |
| 2,845,876 | 8/58 | Keel | 103—162 |
| 2,921,560 | 1/60 | Budzich | 91—433 |
| 2,975,717 | 3/61 | Rynders et al. | 103—120 |

LAURENCE V. EFNER, *Primary Examiner.*